(12) United States Patent
Parks et al.

(10) Patent No.: US 7,883,109 B2
(45) Date of Patent: Feb. 8, 2011

(54) DYNAMIC AIRBAG VENTING

(75) Inventors: Robert A. Parks, Berkley, MI (US); David L. Geyer, Sterling Heights, MI (US); Peter L. Vigeant, Troy, MI (US); Joseph Mannino, Bloomfield Hills, MI (US)

(73) Assignee: Toyoda Gosei Co. Ltd., Gun Aichi (JP)

(*) Notice: Subject to any disclaimer, the term of this patent is extended or adjusted under 35 U.S.C. 154(b) by 254 days.

(21) Appl. No.: 11/961,465

(22) Filed: Dec. 20, 2007

(65) Prior Publication Data

US 2009/0160169 A1  Jun. 25, 2009

(51) Int. Cl.
*B60R 21/276* (2006.01)
(52) U.S. Cl. ...................................................... 280/739
(58) Field of Classification Search .................. 280/739
See application file for complete search history.

(56) References Cited

U.S. PATENT DOCUMENTS

| | | | | |
|---|---|---|---|---|
| 3,788,663 A * | 1/1974 | Weman | ....................... | 280/729 |
| 5,280,953 A * | 1/1994 | Wolanin et al. | ............. | 280/739 |
| 5,542,695 A * | 8/1996 | Hanson | ....................... | 280/729 |
| 5,560,649 A * | 10/1996 | Saderholm et al. | ........ | 280/743.1 |
| 5,931,497 A * | 8/1999 | Fischer | ..................... | 280/743.1 |
| 6,224,101 B1 * | 5/2001 | Nishijima et al. | ......... | 280/743.2 |
| 6,260,877 B1 * | 7/2001 | Rasmussen, Sr. | ........... | 280/729 |
| 6,398,258 B2 * | 6/2002 | Hamada et al. | .......... | 280/743.1 |
| 6,932,385 B2 * | 8/2005 | Hawthorn et al. | ........... | 280/739 |
| 7,264,268 B2 * | 9/2007 | Ehrke | ......................... | 280/729 |
| 7,325,830 B2 * | 2/2008 | Higuchi et al. | .............. | 280/738 |
| 7,328,915 B2 * | 2/2008 | Smith et al. | ................. | 280/739 |
| 7,347,445 B2 * | 3/2008 | Choi | .......................... | 280/729 |
| 7,398,992 B2 * | 7/2008 | Marriott | ..................... | 280/729 |
| 7,597,356 B2 * | 10/2009 | Williams | .................... | 280/739 |
| 2007/0145730 A1 * | 6/2007 | Choi | .......................... | 280/740 |
| 2009/0236837 A1 * | 9/2009 | Fukawatase et al. | ........ | 280/739 |

FOREIGN PATENT DOCUMENTS

JP           06286570 A   * 10/1994

* cited by examiner

*Primary Examiner*—Paul N Dickson
*Assistant Examiner*—Nicole Verley
(74) *Attorney, Agent, or Firm*—Carlson, Gaskey & Olds, PC

(57) ABSTRACT

An example airbag assembly includes an airbag and a duct having an opening for venting gas. The duct moves between a first position where the opening is outside the airbag and a second position where the opening is inside the airbag. Inflating the airbag moves the duct between the first position and the second position.

4 Claims, 4 Drawing Sheets

DYNAMIC AIRBAG VENTING

BACKGROUND OF THE INVENTION

This invention relates to changing airbag venting as the airbag inflates.

Known airbag systems protect vehicle occupants by absorbing forces generated during collisions, for example. Many airbag systems are used in conjunction with other vehicle safety systems, such as seatbelts. Safety systems protect occupants located in various positions within the vehicle.

In particular, airbag designs within some safety systems protect both "in-position" occupants and "out-of-position" occupants. Typically, during a collision, an "in-position" occupant directly strikes a contact face portion of the airbag, whereas an "out-of-position" occupant does not directly strike the contact face. Balancing protection of "in-position" occupants with protect of "out-of-position" occupants is often challenging. Through the contact face, the airbag absorbs forces from the occupant that are generated during the collision.

Generally, it is desirable to provide a softer airbag during the initial stages of airbag deployment. It is also often desirable to provide a harder airbag when the airbag is fully deployed and when the occupant is an "in-position" occupant. As known, occupants may move between the "out-of-position" occupant position and the "in-position" occupant position. Many airbags include vents for changing the softness or the hardness of the airbag as the airbag deploys, but the occupant position does not affect airflow through the vents.

SUMMARY

An example airbag assembly includes an airbag and a duct having an opening for venting gas. The duct moves between a first position where the opening is outside the airbag and a second position where the opening is inside the airbag. Inflating the airbag moves the duct between the first position and the second position.

The example airbag assembly may include an airbag and a duct extending through an opening in the airbag. The duct has a duct vent for venting gas from the duct. The duct moves between the first position that provides a restricted flow from the duct through the opening and a second position that provides a greater flow from the duct through the opening. Inflating the airbag moves the duct between the first position and the second position.

The example airbag assembly may include an airbag and a duct. At least a portion of the duct is moveable relative to at least a portion of the airbag from a first position to a second position. The duct directs gas out of the airbag in the first position. The duct directs less gas out of the airbag in the second position.

BRIEF DESCRIPTION OF THE DRAWINGS

These and other features of the present invention can be best understood from the following specification and drawings, the following of which is a brief description.

DETAILED DESCRIPTION OF THE PREFERRED EMBODIMENT

Figure 1A:
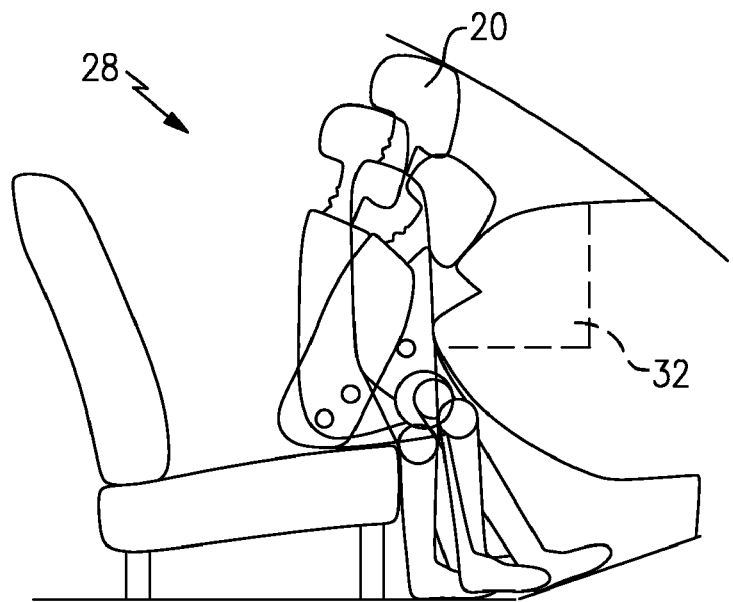
FIG. 1A shows a side view of example "out-of-position" occupants within a vehicle.

FIG. 1A illustrates "out-of-position" occupants 20 within a vehicle 28. As known, "out-of-position" occupants 20 can tend to crowd the airbag deployment area 32 more than an "in-position" occupant 24 shown in FIG. 1B.

In this example, the "out-of-position" occupants 20 are undesirably located near an airbag deployment area 32. By contrast, the "in-position" occupant 24 desirably provides clearance for an airbag to expand from the airbag deployment area 32. As generally known, providing a harder airbag is often desired for the "in-position" occupant 24, but not desired for the "out-of-position" occupants 20.

Figure 2A:
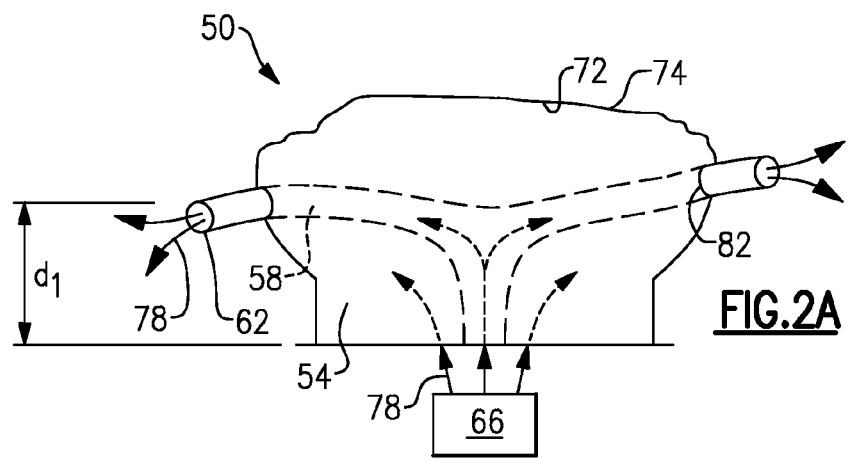
FIG. 2A shows a partially schematic top view of an example airbag assembly having an airbag in a partially expanded position.
Figure 2B:
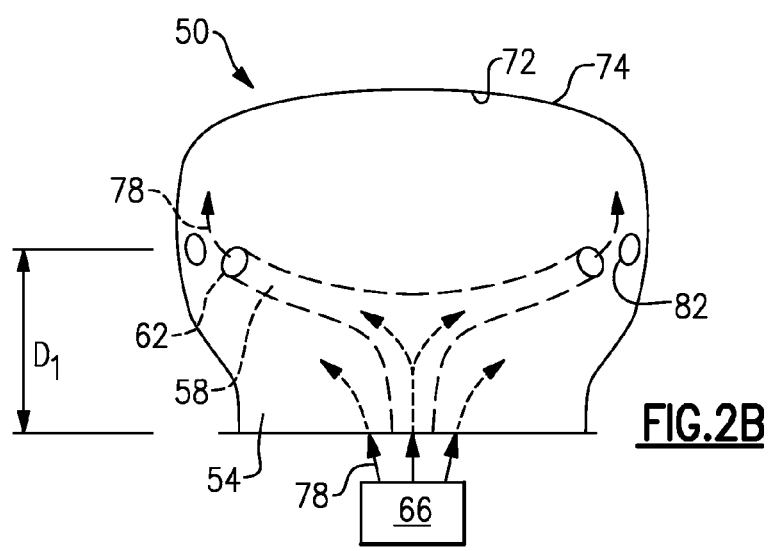
FIG. 2B shows another partially schematic top view of the FIG. 2A airbag assembly having the airbag in a fully expanded position.

Referring now to FIGS. 2A and 2B, an example airbag assembly 50 includes an airbag 54 having at least one duct 58. A duct opening 62 or duct vent at an end of the duct 58 permits gas 78 movement from the duct 58. An airbag inflator 66, represented schematically here, generates gas 78, which is moved into another end of the duct 58 and into the interior portion of the airbag 54. Accordingly, the airbag inflator 66 moves gas 78 that both inflates the airbag 54, and gas 78 that escapes outside of the airbag 54 through the duct opening 62. The duct 58 and the airbag 54 are secured adjacent the airbag inflator 66.

The duct opening 62 extends outside the airbag 54 through the duct opening 62 when the airbag 54 is partially deployed, but not when the airbag 54 is fully deployed. As the airbag 54 inflates, the duct opening 62 moves inside the airbag 54. Distance $d_1$ in FIG. 2A and greater distance $D_1$ in FIG. 2B represent example distances between an airbag opening 82 and the attachment points of the duct 58 and the airbag 54 near the airbag inflator 66. The duct 58 is too short to extend the duct opening 62 outside the airbag 54 through the airbag opening 82 after the airbag 54 is inflated some amount.

Moving the duct 58 within the interior of the airbag 54 changes the location of the duct opening 62. In this example, filling the airbag 54 with gas 78 from the duct opening 62 hardens the airbag 54. As known, hardening the airbag 54 is generally desired during the later stages of deployment, not when the airbag 54 initially deploys. Accordingly, the example assembly 50 pulls the duct opening 62 within the airbag 54 as the airbag 54 approaches the fully deployed position of FIG. 2B, which ensures that the gas 78 moving from the duct opening 62 does not contribute to expanding the airbag 54 during initial deployment of the airbag 54 or when the "out-of-position" occupant of FIG. 1A limits movement of a contact face 74 portion of the airbag 54.

The airbag 54 has softer characteristics during the earlier stages of deployment, say the first 20 milliseconds of deployment, because some of the gas 78 vents to the outside environment through the duct opening 62. As known, softer characteristics of the airbag 54 are desired for "out-of-position" occupants 20 and during initial stages of airbag deployment. Associating the position of the contact face 74 with the characteristics of the airbag 54 facilitates accommodating the "out-of-position" occupant 20 and the "in-position" occupant 24.

Figure 3:
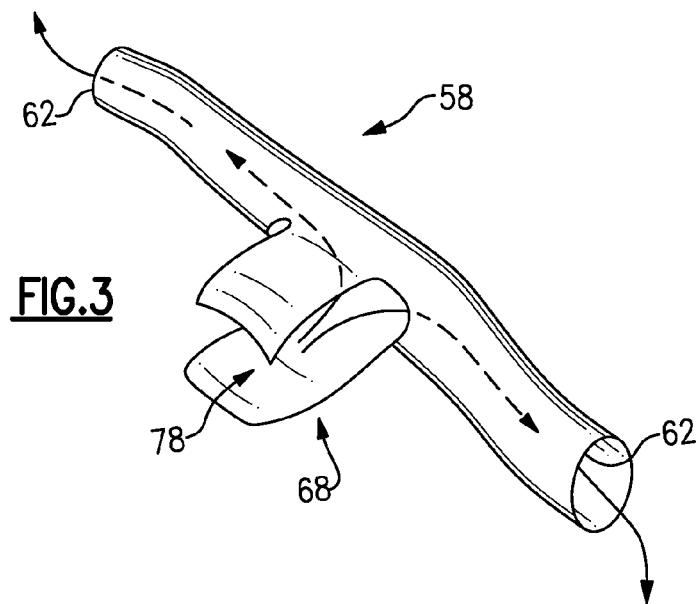
FIG. 3 shows a perspective view of a duct portion of the FIG. 2A airbag assembly.

Referring now to FIG. 3, the duct 58 includes a duct mouth 68 for receiving gas 78 from the airbag inflator 66 (FIG. 2A). The shape of the duct 58 tends to direct air from the mouth 68 toward the duct opening 62. The duct 58 is flexible and foldable with the airbag 54 in the airbag deployment area 32 (FIG. 1A) when the airbag 54 is not inflated. A person skilled in this art would know how to direct gas 78 into both the duct 58 and the interior portion of the airbag 54 and how to design a suitable duct 58 for incorporation into the airbag assembly 50.

Figure 4A:
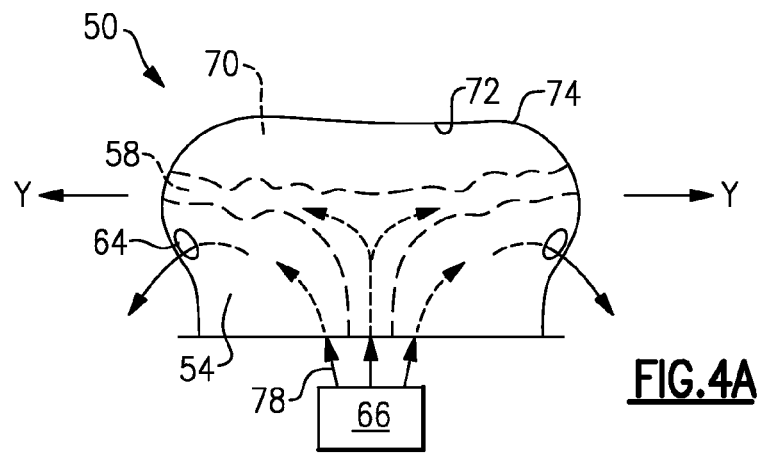
FIG. 4A shows a partially schematic top view of another example airbag assembly having an airbag in a partially expanded position.
Figure 4B:
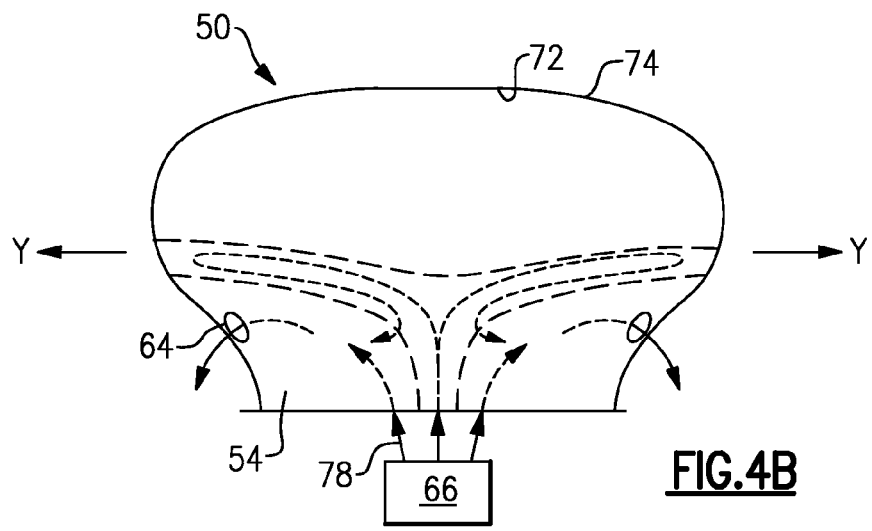
FIG. 4B shows a partially schematic top view of the FIG. 4A airbag assembly having the airbag in a fully expanded position.

In the example of FIGS. 4A and 4B, the duct 58 attaches directly to an interior surface of the airbag 54, which closes the duct opening 62 (FIG. 3) to prevent venting gas 78 from the duct 58 outside the airbag 54. Instead, gas 78 fills the duct 58 forcing the sides of the airbag 54 outward in directions Y. Filling the duct 58 forces the sides of the airbag 54 outward during the early stages of airbag 54 deployment. Without the duct 58, the sides of the airbag 54 move outward as the interior of the airbag 54 fills, rather than as the interior of the duct 58 fills. In this example, the airbag 54 may include discrete vents 64 for venting gas 78 directly from the interior of the airbag 54. As known, discrete vents 64 help soften the deploying airbag 54.

Figure 5A:
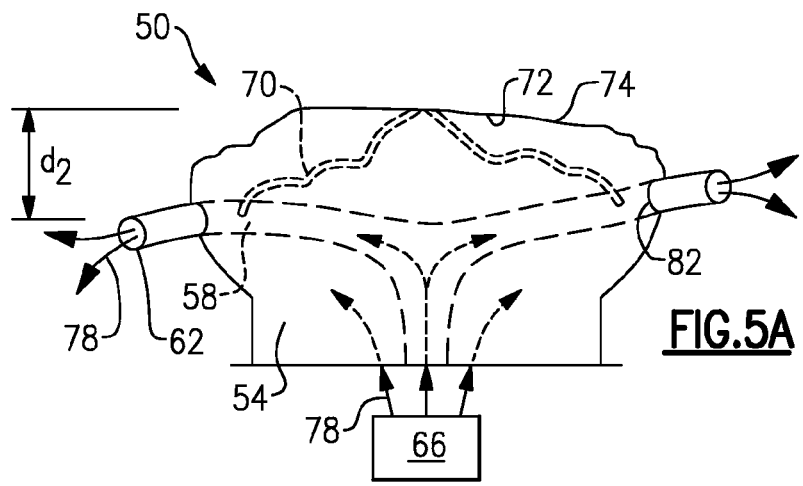
FIG. 5A shows a partially schematic top view of yet another example airbag assembly having an airbag in a partially expanded position.
Figure 5B:
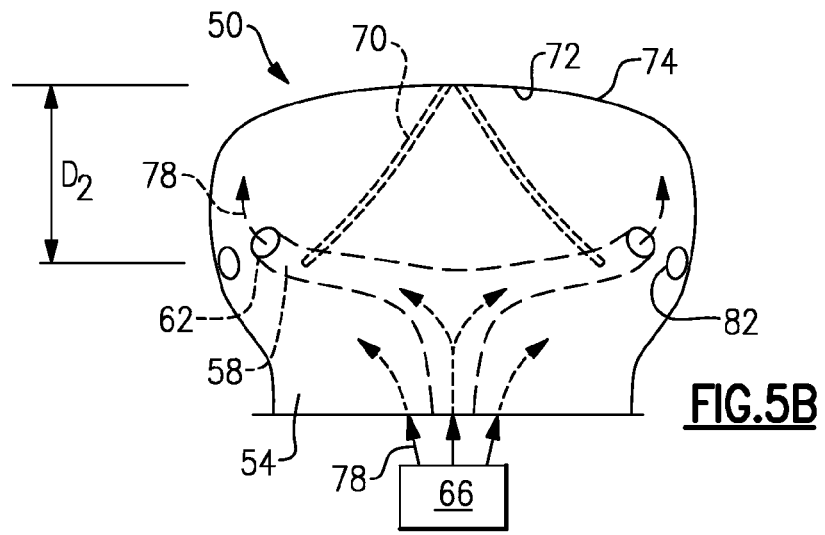
FIG. 5B shows a partially schematic top view of the FIG. 5A airbag assembly having the airbag in a fully expanded position.

Referring now to FIGS. 5A and 5B in another example, the interior of the airbag 54 may include at least one tether 70 for moving the duct 58 relative the airbag 54. As shown, the tether 70 secures the duct 58 to an interior surface 72 of the airbag 54. In this example, one end of the tether 70 attaches to the interior surface 72 of the airbag near a contact face 74 of the airbag 54 opposing the airbag inflator 66, and another end of the tether 70 attaches directly to the duct 58. The ends of the tether 70 are respectively sewn to the interior surface 72 of the airbag 54 and the duct 58, for example. Accordingly, moving the interior surface 72 of the airbag 54 moves the tether 70, which moves the duct 58.

Figure 1B:
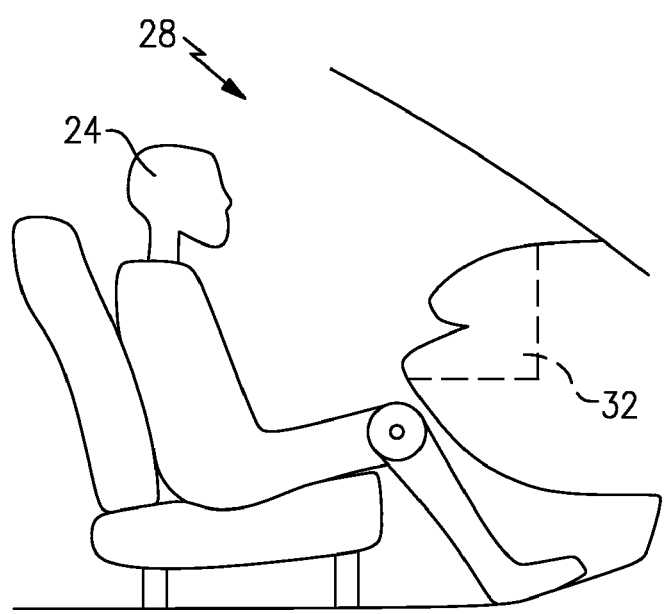
FIG. 1B shows a side view of an example "in-position" occupant within a vehicle.

The airbag opening 82 within the airbag 54 facilitates moving the duct 58 relative other portion of the airbag 54. In this example, moving the contact face 74 moves the tether 70, which pulls the duct 58 inside the airbag 54. Ordinarily, the contact face 74 is the portion of the airbag 54 for contacting an occupant 20, 24 (FIGS. 1A-1B). Thus, in this example, the tether 70 does not pull the duct 58 fully inside the airbag 54 until the contact face 74 extends sufficiently away from the airbag deployment area 32. Distance $d_2$ in FIG. 5A and greater distance $D_2$ in FIG. 5B represent example distances between the airbag opening 82 and the attachment location of the tether adjacent the contact face 74.

The contact face 74 of the airbag 54 moves further as the airbag 54 deploys. As known, during deployment of the airbag 54, the "out-of-position" occupant 20 of FIG. 1A would strike the contact face 74 of the airbag 54 sooner than the "in-position" occupant 24 of FIG. 1B. Moving the contact face 74 increases the distance between the contact face 74 and the attachment point of the tether 70 to the duct 58. Limiting movement of the contact face 74, such as with the "out-of-position" occupant 20 of FIG. 1A, would prevent or otherwise limit movement of the tether 70 and the duct 58, and would cause the duct 58 to continue to vent outside of the airbag 54 until the occupant 20 moves to permit expansion of the contact face 74.

Moving the duct 58 within the airbag 54 does permit some gas 78 to escape from the airbag 54 through the airbag opening 82. However, the duct 58 provides a more direct path between the gas 78 from the airbag inflator 66 and the outside of the airbag 54. Thus the amount of the gas 78 moving from the airbag inflator 66 and through the duct opening 62, is greater than the amount of gas 78 moving from the airbag inflator 66 to the interior of the airbag 54 and through the airbag opening 82 when the duct 58 is fully within the airbag 54.

Figure 6:
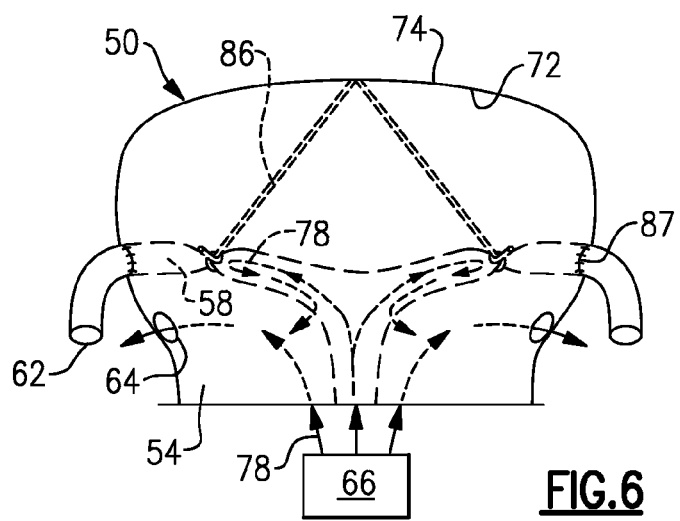
FIG. 6 shows a partially schematic top view of yet another example airbag assembly having an airbag in a fully expanded position.

In the FIG. 6 example, the airbag assembly 50 include at least one clamping tether 86 that closes the duct 58 to restrict flow of gas 78 through the duct opening 62 during the latter stages of airbag 54 deployment. In such an example, the clamping tether 86 kinks the duct 58 as the contact face 74 moves away from the airbag deployment area 32. As previously described, moving the airbag contact face 74 away from the airbag deployment area 32 moves the tether 86, which, in this example, causes the tether 86 to kink the duct 58. In this example, the duct 58 does not move within the airbag opening 82. Stitches 87 may secure the duct 58 relative the airbag 54.

Kinking the duct 58 with the tether 86 restricts flow through the duct 58. As a result, gas 78 that would formerly move outside the airbag 54 through the duct opening 62 stays within the airbag 54. As previously described, providing more air or more gas 78 to the interior of the airbag 54 hardens the airbag 54. As flow through the duct 58 is blocked, the airbag inflator 66 directs gas 78 formerly directly through the duct 58 directly into the interior of the airbag 54.

Figure 7:
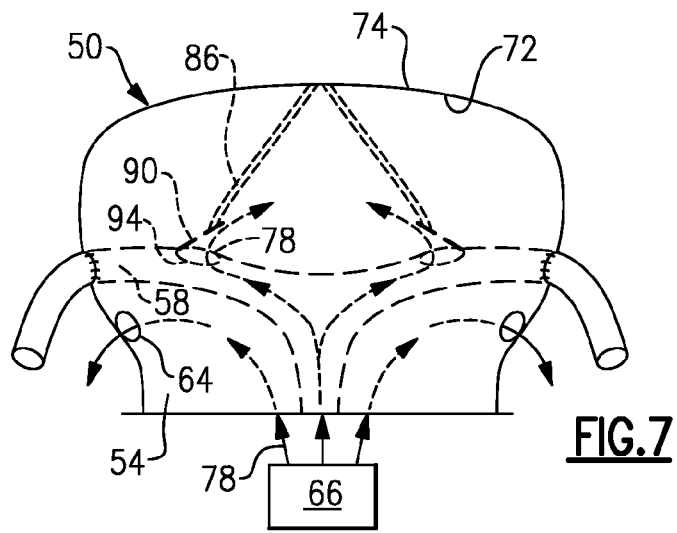
FIG. 7 shows a partially schematic top view of yet another example airbag assembly having an airbag in a fully expanded position.

In the example of FIG. 7, the tether 86 pulls a flap 94 on the duct 58, which permits gas 78 to escape through an aperture 98 within the duct 58 into the interior of the airbag 54. Accordingly, as the contact face 74 expands, the tether 86 opens the aperture to direct more gas 78 into the interior of the airbag 54. A hook and loop fastener may secure the flap 94 over the aperture 98 until the tether 86 opens the flap 94.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. An airbag assembly, comprising:
    an airbag; and
    a duct adjacent an airbag opening in said airbag and having
        a duct vent for venting gas from said duct, said duct moveable between a first arrangement that provides a first flow from said duct through the airbag opening and a second arrangement that provides a second flow from said duct through the airbag opening, said first flow greater than said second flow, wherein inflating said airbag with gas moving outside of said duct moves said duct between the first arrangement and the second arrangement, wherein said duct further comprises a mouth at an end of the duct opposite the duct vent, said mouth configured to communicate gas directly to an interior of said airbag such that the gas bypasses said duct.

2. The airbag assembly of claim 1, wherein said mouth is configured to communicate gas directly to an interior of said airbag when said duct is positioned in the first arrangement and the second arrangement.

3. The airbag assembly of claim 1, wherein the first arrangement of said duct includes a portion of said duct outside said airbag, and the second arrangement of said duct includes said portion of said duct within said airbag.

4. The airbag assembly of claim 1, wherein the second flow comprises no flow.

* * * * *